United States Patent
Pearson et al.

(10) Patent No.: US 11,797,329 B2
(45) Date of Patent: Oct. 24, 2023

(54) PAUSING DEPLOYMENT OF A VIRTUAL MACHINE PRIOR TO A MACHINE NAME DEPENDENCY

(71) Applicant: Microsoft Technology Licensing, LLC, Redmond, WA (US)

(72) Inventors: Daniel James Pearson, Redmond, WA (US); Md. Daud Hossain Howlader, Bothell, WA (US); Yitzchok Meir Pinkesz, Redmond, WA (US); Sushant Pramod Rewaskar, Redmond, WA (US); Chandramouleswaran Ravichandran, Woodinville, WA (US); Aswin Parthasarathy Akkur Rajamannar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 16/807,153

(22) Filed: Mar. 2, 2020

(65) Prior Publication Data
US 2021/0141657 A1 May 13, 2021

Related U.S. Application Data

(60) Provisional application No. 62/932,382, filed on Nov. 7, 2019.

(51) Int. Cl.
*G06F 9/455* (2018.01)
*G06F 9/445* (2018.01)

(52) U.S. Cl.
CPC ........ *G06F 9/45558* (2013.01); *G06F 9/4451* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS 7,577,722 B1 * 8/2009 Khandekar ......... G06F 9/45558
709/220
8,839,228 B2 9/2014 Thorat et al.
(Continued)

FOREIGN PATENT DOCUMENTS

GB 2394570 A 4/2004

OTHER PUBLICATIONS

Chandrappa, et al., "Mobile Connectivity Service For Creating A Private Mobile Network", Application as Filed in U.S. Appl. No. 62/929,941, filed Nov. 3, 2019, 38 Pages.
(Continued)

*Primary Examiner* — Lewis A Bullock, Jr.
*Assistant Examiner* — Melissa A Headly
(74) *Attorney, Agent, or Firm* — Wade IP Law PLLC

(57) ABSTRACT

Techniques are described herein that are capable of pausing deployment of a pre-provisioned virtual machine. Deployment of a virtual machine on a computing system is initiated. The deployment of the virtual machine is paused, prior to execution of code that depends on a name of the virtual machine, to wait for receipt of user-specific setting(s) of the virtual machine. The deployment of the virtual machine is continued based at least in part on receipt of the user-specific setting(s). Continuing the deployment includes configuring the virtual machine to have at least one of the user-specific setting(s).

20 Claims, 6 Drawing Sheets

(56) References Cited

U.S. PATENT DOCUMENTS

| | | |
|---|---|---|
| 9,052,940 B2 | 6/2015 | Chieu et al. |
| 9,110,732 B1 * | 8/2015 | Forschmiedt ............. G06F 8/61 |
| 9,152,406 B2 | 10/2015 | De et al. |
| 9,323,565 B2 | 4/2016 | Li et al. |
| 2013/0297921 A1 | 11/2013 | Wright et al. |
| 2015/0178109 A1 * | 6/2015 | Li ....................... G06F 9/45558 |
| | | 718/1 |
| 2018/0150306 A1 | 5/2018 | Govindaraju et al. |
| 2019/0278620 A1 | 9/2019 | Korbar et al. |

OTHER PUBLICATIONS

"International Search Report and Written Opinion Issued in PCT Application No. PCT/US2020/057581", dated Feb. 5, 2021, 11 Pages.

"Office Action Issued in European Patent Application No. 20811478.5", dated Mar. 28, 2023, 6 Pages.

* cited by examiner

PAUSING DEPLOYMENT OF A VIRTUAL MACHINE PRIOR TO A MACHINE NAME DEPENDENCY

CROSS-REFERENCE TO RELATED APPLICATION(S)

This application claims the benefit of U.S. Provisional Application No. 62/932,382, filed Nov. 7, 2019 and entitled "Pausing Deployment of a Virtual Machine Prior to a Machine Name Dependency," the entirety of which is incorporated herein by reference.

BACKGROUND

A virtual machine (VM) is an emulation of a computer system. Accordingly, the virtual machine is configured to provide functionality of a physical computer system. A virtual machine typically is created and run by a hypervisor (a.k.a. virtual machine monitor (VMM)). For instance, a cloud computing service may include a hypervisor to create virtual machines for users of the cloud computing service. Any one or more of the virtual machines may be pre-provisioned. A pre-provisioned virtual machine is a virtual machine that is provisioned (i.e., created) before a user requests the virtual machine. For instance, when a user wants a virtual machine to be provisioned, the user may specify configuration parameters of the virtual machine. If the cloud computing service has a pre-provisioned virtual machine with the specified configuration parameters, the cloud computing service may assign that pre-provisioned virtual machine to the user. Once the user receives the pre-provisioned virtual machine, the user may configure the pre-provisioned virtual machine with user-specific setting(s) (e.g., a new name). However, configuring the pre-provisioned virtual machine with such user-specific setting(s) may necessitate a reboot of the pre-provisioned virtual machine. Rebooting the pre-provisioned virtual machine may consume a substantial amount of time.

SUMMARY

Various approaches are described herein for, among other things, pausing deployment of a virtual machine prior to a machine name dependency. Provisioning a virtual machine is defined herein to mean creating a virtual machine. A pre-provisioned virtual machine is a virtual machine that is provisioned (i.e., created) before a user requests the virtual machine. Deployment of a virtual machine is defined herein to mean configuring the virtual machine. Deployment of the virtual machine occurs in response to provisioning of the virtual machine. One or more provisioning agents may be used to provision the virtual machine. A machine-based provisioning agent is a provisioning agent that does not use user-specific (e.g., user-specified) settings to configure a virtual machine. For instance, the machine-based provisioning agent may use default settings to configure the virtual machine. A user-specific provisioning agent is a provisioning agent that uses user-specific setting(s) (e.g., setting(s)) that are specified by a user who requests the virtual machine) to configure a virtual machine.

In a first example approach, a machine-based provisioning agent is executed on a virtual machine that is hosted on a computing system. The machine-based provisioning agent initiates deployment of the virtual machine, installs a user-specific provisioning agent on the virtual machine, and initiates a restart of the virtual machine. In response to the restart of the virtual machine, the user-specific provisioning agent executes on the virtual machine. The user-specific provisioning agent pauses the deployment of the virtual machine, prior to execution of code that depends on a name of the virtual machine, to wait for receipt of user-specific setting(s) of the virtual machine. The user-specific provisioning agent then continues the deployment of the virtual machine, which includes configuring the virtual machine to have at least one of the user-specific setting(s) (e.g., a user-specific name), based at least in part on receipt of the user-specific setting(s).

In a second example approach, deployment of a virtual machine on a computing system is initiated. The deployment of the virtual machine is paused, prior to execution of code that depends on a name of the virtual machine, to wait for receipt of user-specific setting(s) of the virtual machine. The deployment of the virtual machine is continued based at least in part on receipt of the user-specific setting(s). Continuing the deployment includes configuring the virtual machine to have at least one of the user-specific setting(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
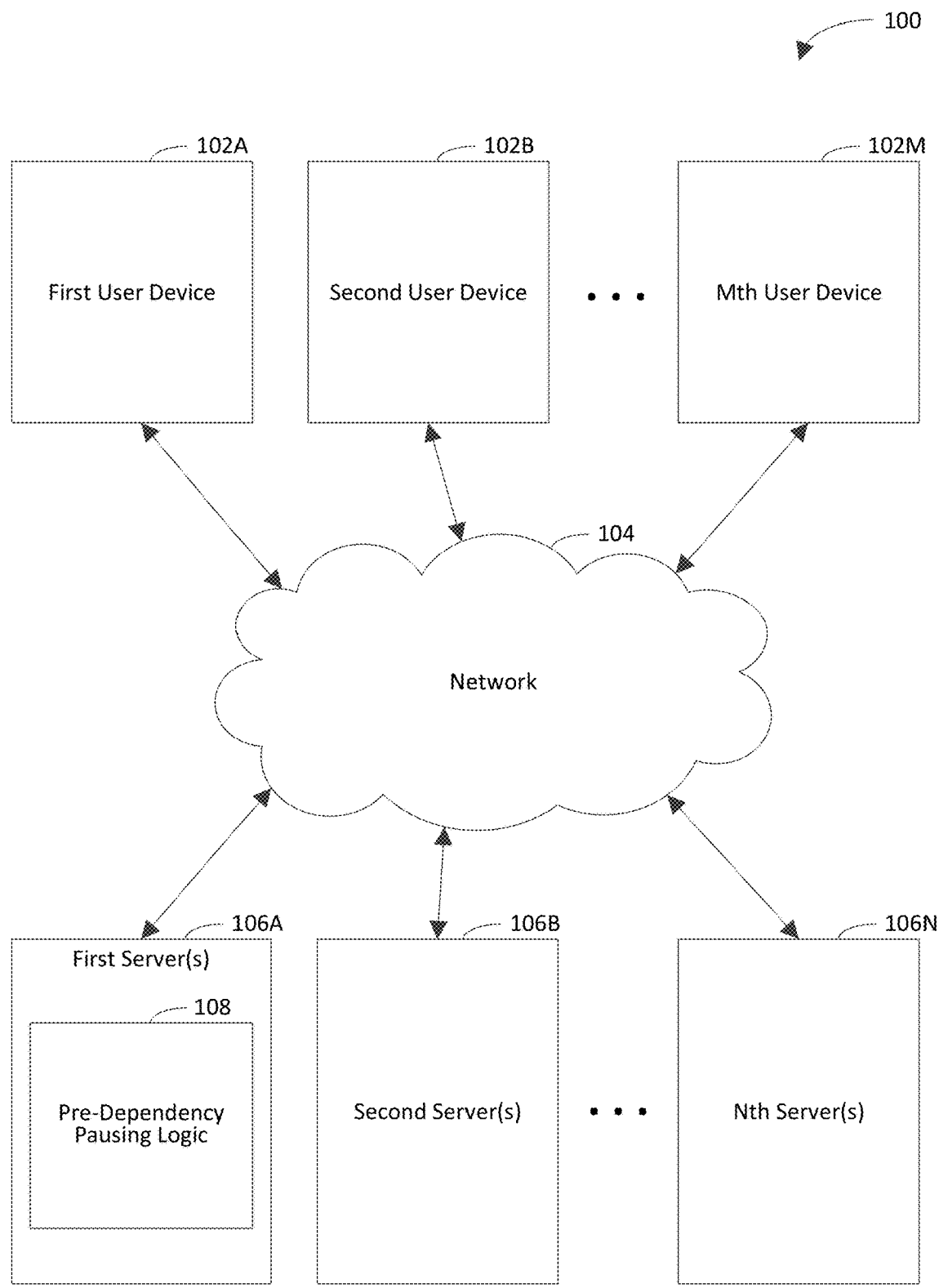
FIG. 1 is a block diagram of an example pre-dependency pausing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of pausing deployment of a virtual machine prior to a machine name dependency. Provisioning a virtual machine is defined herein to mean creating a virtual machine. A pre-provisioned virtual machine is a virtual machine that is provisioned (i.e., created) before a user requests the virtual machine. Deployment of a virtual machine is defined herein to mean configuring the virtual machine. Deployment of the virtual machine occurs in response to provisioning of the virtual machine. One or more provisioning agents may be used to provision the virtual machine. A machine-based provisioning agent is a provisioning agent that does not use user-specific (e.g., user-specified) settings to configure a virtual machine. For instance, the machine-based provisioning agent may use default settings to configure the virtual machine. A user-specific provisioning agent is a provisioning agent that uses user-specific setting(s) (e.g., setting(s) that are specified by a user who requests the virtual machine) to configure a virtual machine.

Example techniques described herein have a variety of benefits as compared to conventional techniques for pre-provisioning virtual machines. For instance, the example techniques may be capable of pausing deployment of a pre-provisioned virtual machine, prior to execution of code that depends on a name of the virtual machine, to enable one or more user-specific settings (e.g., a user-specified name of the virtual machine) to be applied to the virtual machine before continuing with the deployment. By pausing the deployment to apply the user-specific setting(s), the virtual machine need not be rebooted (e.g., in response to receipt of the user-specific setting(s)) in order for the user-specific setting(s) to take effect. The example techniques may be capable of pre-provisioning virtual machines and reusing the virtual machines upon user request to decrease latency and increase reliability associated with deployment of the virtual machines. For instance, the example techniques may customize an operating system of a virtual machine during pre-creation of the virtual machine, reboot the virtual machine, and pause deployment of the virtual machine, prior to execution of code that depends on a name of the virtual machine, in a mode in which user-specific setting(s) may be applied. By injecting the user-specific setting(s) into the virtual machine using a mechanism, such as an ISO, the user-specific setting(s) may be applied to the virtual machine without a reboot of the virtual machine. For example, the virtual machine may be rebooted prior to receipt of a request for the virtual machine from a user. In accordance with this example, the reboot may be performed on the platform's time, rather than during the user's deployment time. In further accordance with this example, the virtual machine need not be rebooted after the user-specific setting(s) are received.

A machine-based provisioning agent and a user-specific provisioning agent may be configured to execute on the virtual machine. The machine-based provisioning agent may be configured to perform a first portion of operations that are configured to deploy the virtual machine. The user-specific provisioning agent may be configured to perform a second portion of the operations that are configured to deploy the virtual machine. By executing both the machine-based provisioning agent and the user-specific provisioning agent on the virtual machine, speed and efficiency of the deployment of the virtual machine may be increased. For instance, if the virtual machine executes a Microsoft Windows® operating system, the virtual machine must be restarted after the name of the virtual machine is created or changed, unless both the machine-based provisioning agent and the user-specific provisioning agent execute on the virtual machine. The example techniques described herein may cause the user-specific provisioning agent to run before the operating system has taken a dependency on the name of the virtual machine, which may enable a restart of the virtual machine to be avoided. Accordingly, the example techniques may eliminate a need to restart the virtual machine after the name of the virtual machine is created or changed.

The example techniques may reduce an amount of time and/or resources (e.g., processor cycles, memory, network bandwidth) that is consumed to deploy a virtual machine. For instance, the example techniques may reduce an amount of time that is consumed to deploy a pre-provisioned virtual machine by a factor of at least 15 (e.g., taking into consideration only time spent inside the virtual machine and not including control path times). The example techniques may thereby reduce a cost associated with utilizing the aforementioned resources. The example techniques may increase efficiency of a computing system that is used to deploy the virtual machine. The example techniques may increase efficiency of a user of the virtual machine. For example, by reducing an amount of time that is consumed to deploy the virtual machine to the user, downtime of the user may be reduced. The example techniques may thereby increase efficiency of the user.

FIG. 1 is a block diagram of an example pre-dependency pausing system 100 in accordance with an embodiment. Generally speaking, the pre-dependency pausing system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the pre-dependency pausing system 100 pauses deployment of a virtual machine prior to execution of code that depends on a name of the virtual machine. For instance, the pre-dependency pausing system 100 may pause the deployment of the virtual machine to enable one or more user-specific settings to be applied to the virtual machine before continuing with the deployment. Detail regarding techniques for pausing deployment of a virtual machine prior to execution of code that depends on a name of the virtual machine is provided in the following discussion.

As shown in FIG. 1, the pre-dependency pausing system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, the servers 106A-106N are configured to host respective Web sites, so that the Web sites are accessible to users of the pre-dependency pausing system 100.

The first server(s) 106A are shown to include pre-dependency pausing logic 108 for illustrative purposes. The pre-dependency pausing logic 108 is configured to pause deployment of a virtual machine prior to execution of code that depends on a name of the virtual machine. In one example implementation, the pre-dependency pausing logic 108 executes a machine-based provisioning agent on a virtual machine that is hosted on the first server(s) 106A. The machine-based provisioning agent initiates deployment of the virtual machine, installs a user-specific provisioning agent on the virtual machine, and initiates a restart of the virtual machine. In response to the restart of the virtual machine, the pre-dependency pausing logic 108 executes the user-specific provisioning agent on the virtual machine. The user-specific provisioning agent pauses the deployment of the virtual machine, prior to execution of code that depends on a name of the virtual machine, to wait for receipt of user-specific setting(s) of the virtual machine. The user-specific provisioning agent then continues the deployment of the virtual machine, which includes configuring the virtual machine to have at least one of the user-specific setting(s) (e.g., a user-specific name), based at least in part on receipt of the user-specific setting(s).

In another example implementation, the pre-dependency pausing logic 108 initiates deployment of a virtual machine on the first server(s) 106A. The pre-dependency pausing logic 108 pauses the deployment of the virtual machine prior to execution of code that depends on a name of the virtual machine to wait for receipt of user-specific setting(s) of the virtual machine. The pre-dependency pausing logic 108 continues the deployment of the virtual machine based at least in part on receipt of the user-specific setting(s). The pre-dependency pausing logic 108 continues the deployment by configuring the virtual machine to have at least one of the user-specific setting(s).

The implementations described above may be employed in any suitable context. For instance, the implementations may be employed in a Microsoft Windows® context. In this context, the use of a re-provisioning agent (e.g., a native application) that is launched by the Session Manager may enable the virtual machine to be renamed before system initialization occurs. During pre-provisioning, the virtual machine may be started, and Windows Setup and the Windows Provisioning Agent may be run to completion. The re-provisioning agent may be copied to the Windows\System32 directory; the SetupExecute registry entry may be modified; and the system may be restarted. The re-provisioning agent may then wait on a provisioning signal. The insertion of a provisioning mechanism (e.g., an ISO) containing the user-specific configuration settings may trigger a re-provisioning phase in which a new computer name of the virtual machine can be configured using registry application programming interfaces (APIs). In this context, three registry keys may be changed for the rename: (1) HKLM\SYSTEM\CCS\Control\ComputerName\Computer Name ComputerName, (2) HKLM\SYSTEM\CCS\ Services\ Tcpip\Parameters\HostName, and (3) HKLM\ SYSTEM\ CCS\Services\Tcpip\Parameters\NV HostName. The re-provisioning agent may be configured using the Session Manager key HKLM\SYSTEM\CurrentControl Set\Control\Session Manager\SetupExecute.

The pre-dependency pausing logic 108 may be implemented in various ways to pause deployment of a pre-provisioned virtual machine, including being implemented in hardware, software, firmware, or any combination thereof. For example, the pre-dependency pausing logic 108 may be implemented as computer program code configured to be executed in one or more processors. In another example, at least a portion of the pre-dependency pausing logic 108 may be implemented as hardware logic/electrical circuitry. For instance, at least a portion of the pre-dependency pausing logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The pre-dependency pausing logic 108 is shown to be incorporated in the first server(s) 106A for illustrative purposes and is not intended to be limiting. It will be recognized that the pre-dependency pausing logic 108 (or any portion(s) thereof) may be incorporated in any one or more of the user devices 102A-102M. For example, client-side aspects of the pre-dependency pausing logic 108 may be incorporated in one or more of the user devices 102A-102M, and server-side aspects of pre-dependency pausing logic 108 may be incorporated in the first server(s) 106A. In another example, the pre-dependency pausing logic 108 may be distributed among the user devices 102A-102M. In yet another example, the pre-dependency pausing logic 108 may be incorporated in a single one of the user devices 102A-102M. In another example, the pre-dependency pausing logic 108 may be distributed among the server(s) 106A-106N. In still another example, the pre-dependency pausing logic 108 may be incorporated in a single one of the servers 106A-106N.

Figure 2:
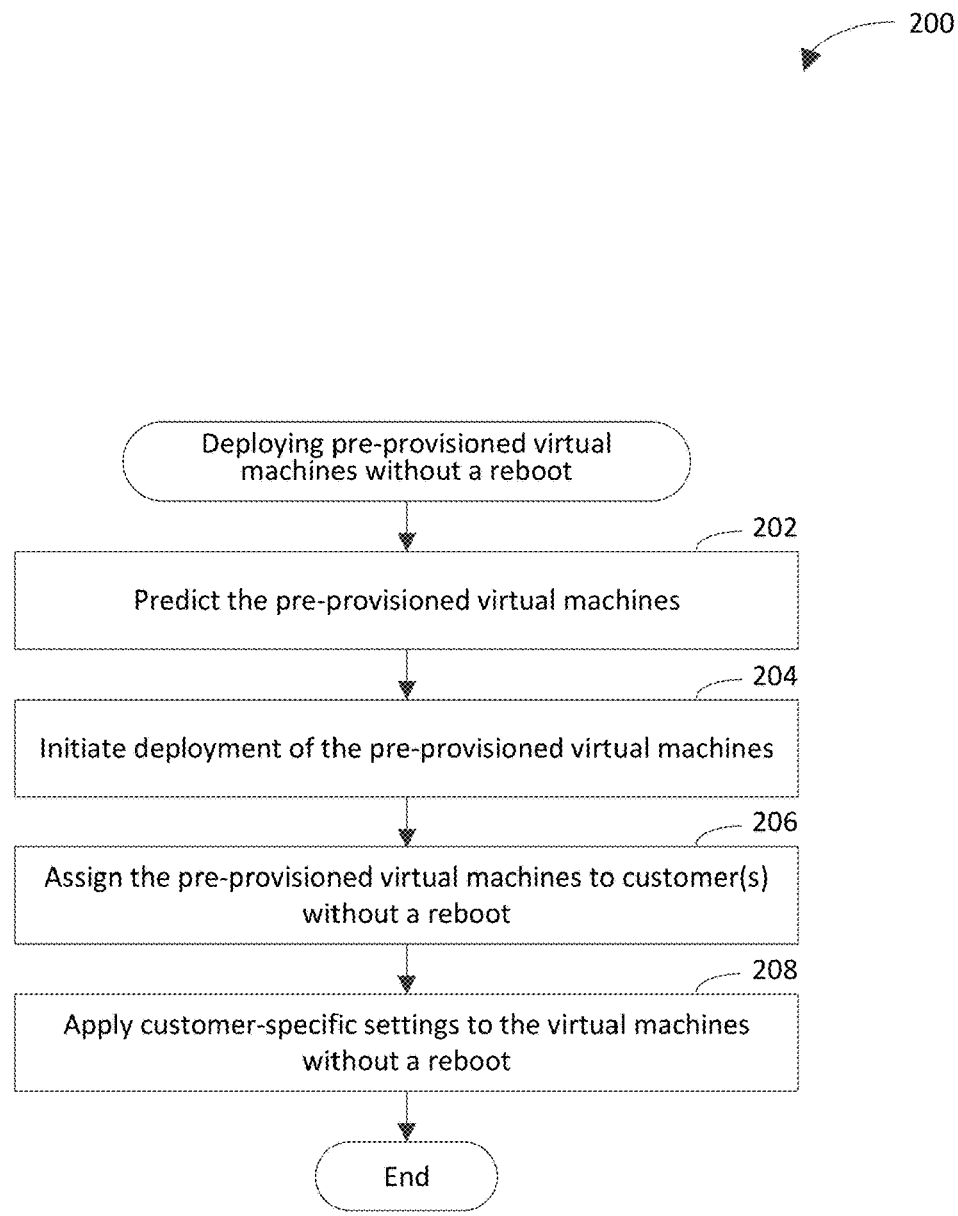
FIG. 2 depicts a flowchart of an example method for deploying pre-provisioned virtual machines without a reboot in accordance with an embodiment.
Figure 3:
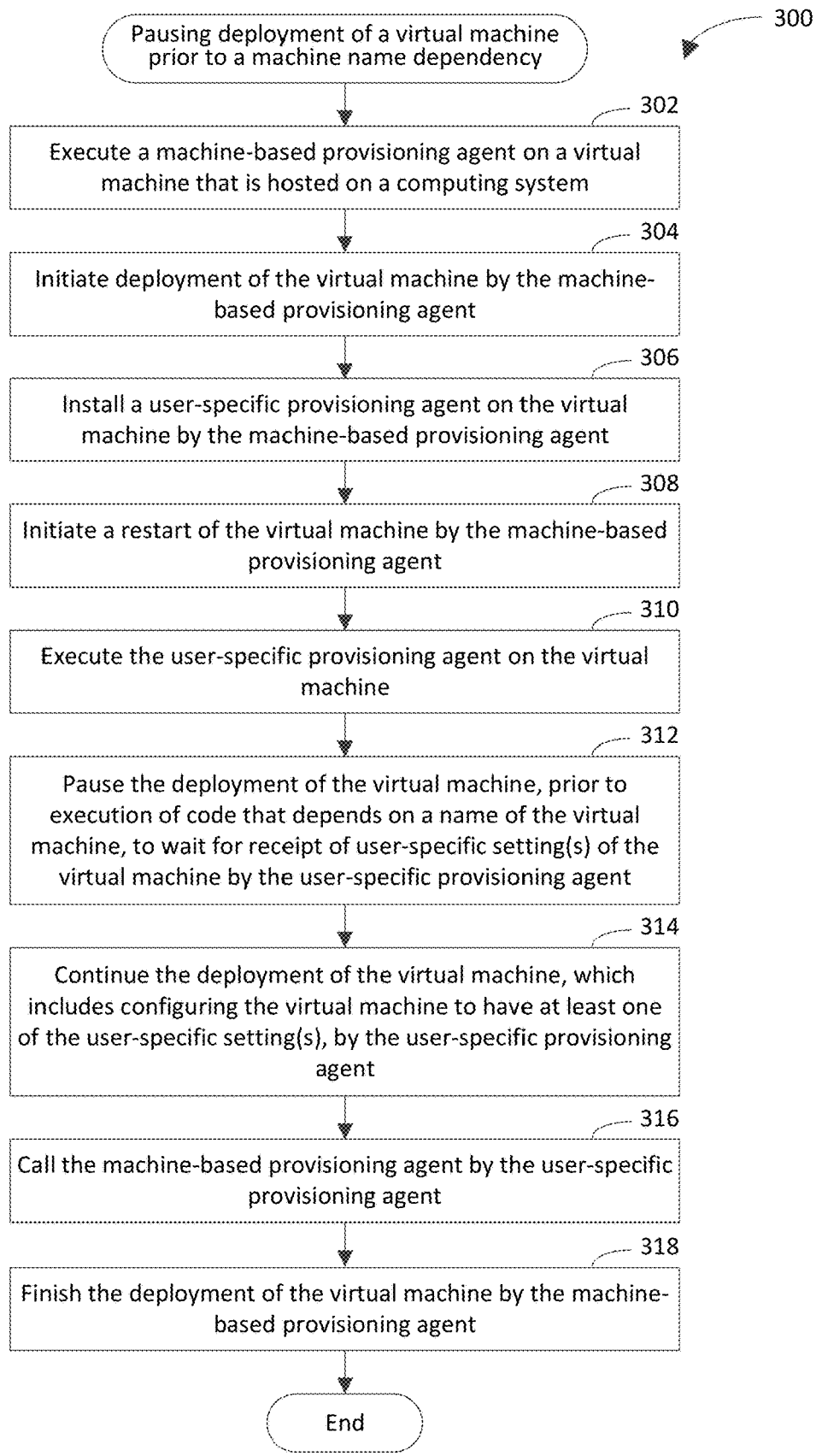
FIGS. 3-4 depict flowcharts of example methods for pausing deployment of a virtual machine prior to a machine name dependency in accordance with embodiments.
Figure 4:
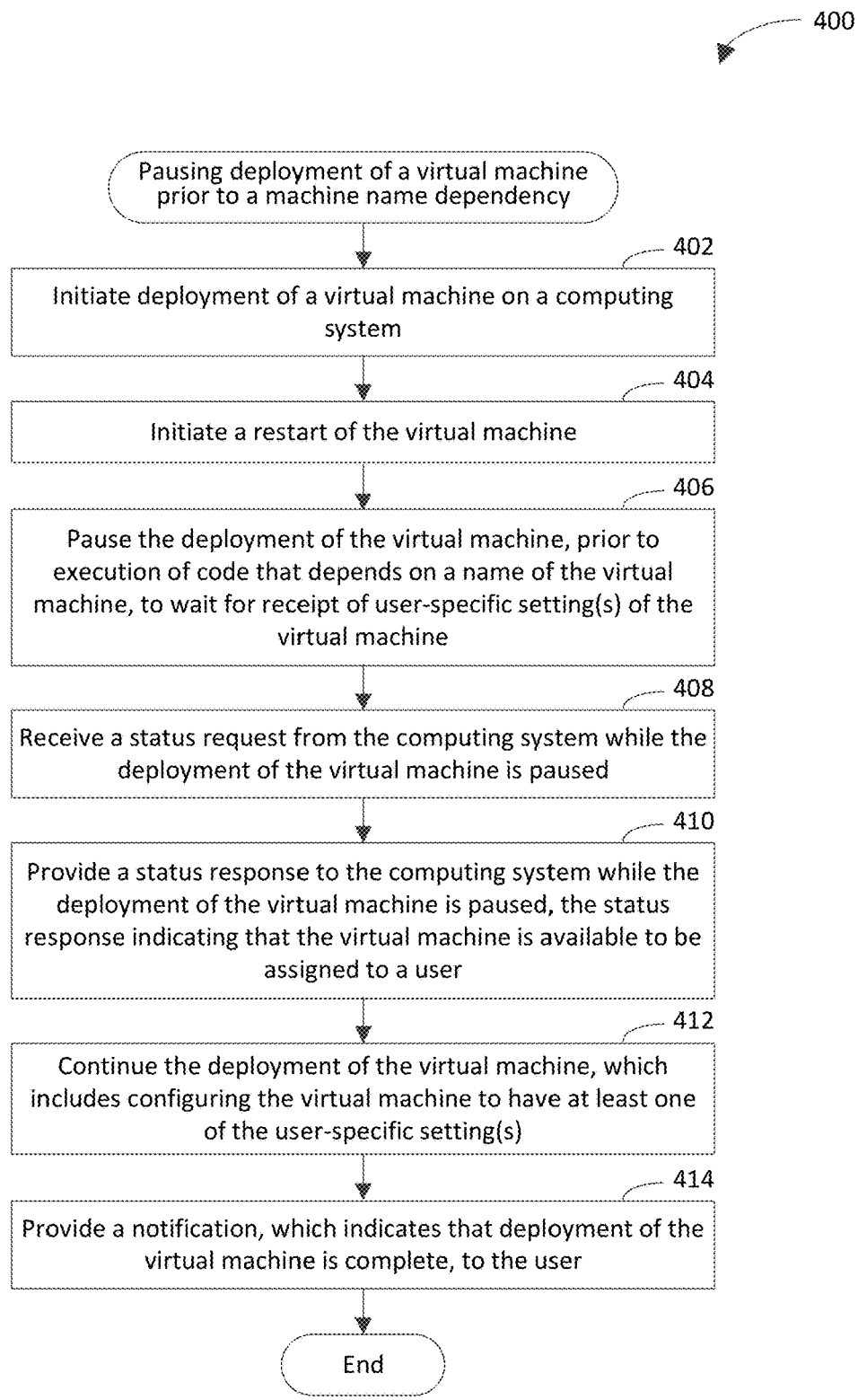
Figure 5:
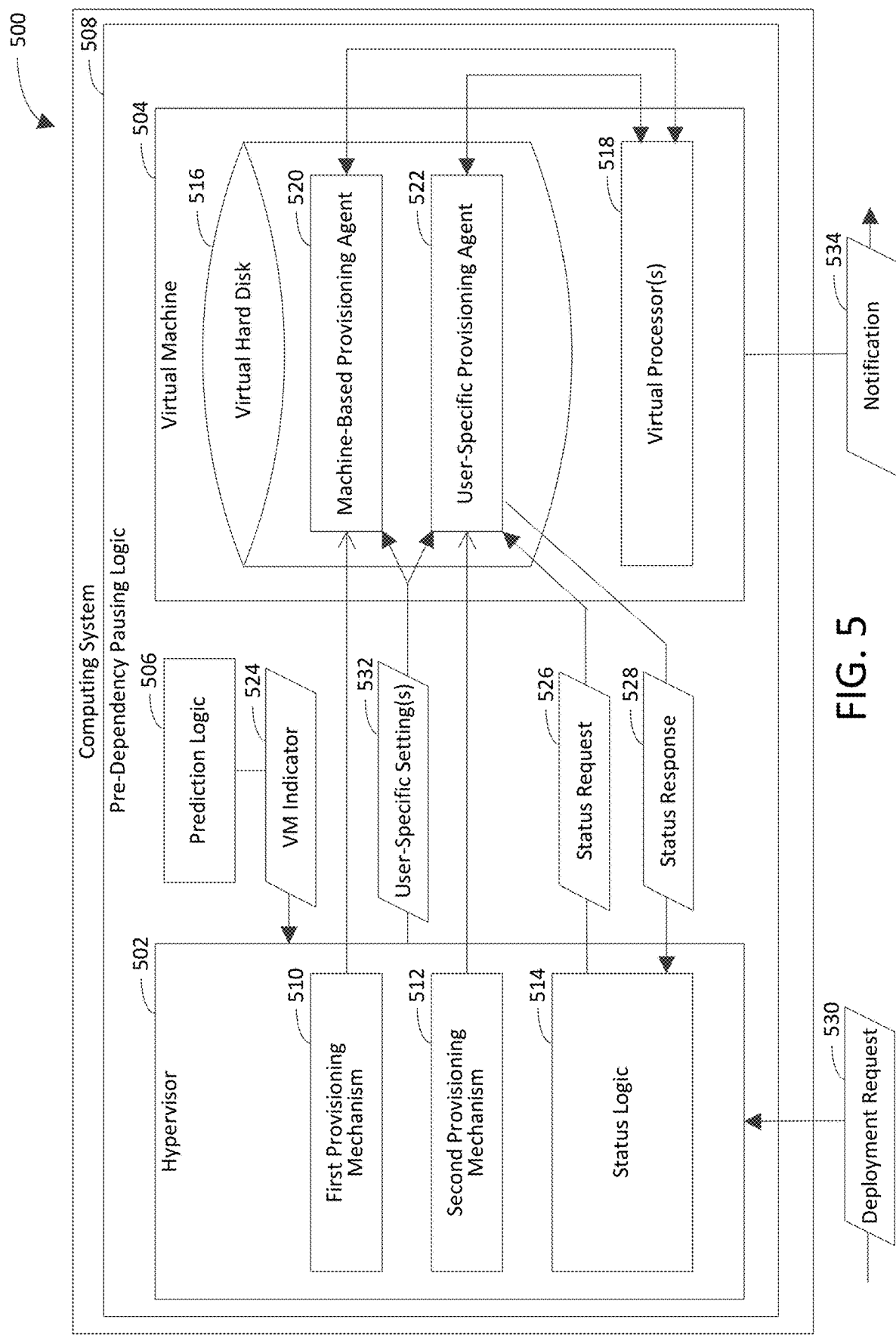
FIG. 5 is a system diagram of an exemplary computing system in accordance with an embodiment.

FIG. 2 depicts a flowchart 200 of an example method for deploying pre-provisioned virtual machines without a reboot in accordance with an embodiment. FIGS. 3-4 depict flowcharts 300, 400 of example methods for pausing deployment of a virtual machine prior to a machine name dependency in accordance with embodiments. Flowcharts 200, 300, and 400 may be performed by the first server(s) 106A, shown in FIG. 1, for example. For illustrative purposes, flowcharts 200, 300, and 400 are described with respect to computing system 500 shown in FIG. 5, which is an example implementation of the first server(s) 106A. As shown in FIG. 5, the computing system 500 includes pre-dependency pausing logic 508. The pre-dependency pausing logic 508 includes a hypervisor 502, a virtual machine 504, and prediction logic 506. The hypervisor includes a first provisioning mechanism 510, a second provisioning mechanism 512, and status logic 514. The virtual machine 504 includes a virtual hard disk 516 and virtual processor(s) 518. The virtual hard disk 516 stores a machine-based provisioning agent 520 and a user-specific provisioning agent 522. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, the pre-provisioned virtual machines are predicted. For example, future user demand for virtual machines may be predicted based at least in part on historical data. In accordance with this example, the historical data may indicate (e.g., specify) a number of virtual machines that have been deployed for a user (e.g., customer) in the past and configuration parameters of those virtual machines. Examples of a configuration parameter of a virtual machine include but are not limited to a size of the virtual machine (e.g., a number of virtual central processing units (CPUs) that are attached to the virtual machine and/or an amount of memory that is assigned to the virtual machine), a type of storage that the virtual machine includes, an operating system (OS) of the virtual machine (e.g., a version thereof), a number of virtual network adapters associated with the virtual machine, and a number of virtual hard disks that are attached to the virtual machine. In an example implementation, the prediction logic 506 predicts the pre-provisioned virtual machines. The prediction logic 506 may generate a VM indicator 524 to indicate the predicted pre-provisioned virtual machines.

At step 204, deployment of the pre-provisioned virtual machines is initiated. For instance, configuration parameter(s) of each pre-provisioned virtual machine may be determined. The pre-provisioned virtual machines may be provisioned with default settings. Examples of a default setting include but are not limited to a computer name, a user name, and a user password. Each of the pre-provisioned virtual machines may be a single instance virtual machine. Accordingly, one pre-provisioned virtual machine per tenant may be deployed. The pre-provisioned virtual machines may be configured to be in a started state, meaning that no user-specified settings have yet been applied to the pre-provisioned virtual machines. In an example implementation, the machine-based provisioning agent 520 initiates the deployment of the pre-provisioned virtual machines. For example, the hypervisor 502 may generate a pool of virtual machines based at least in part on the VM indicator. In accordance with this example, the hypervisor 502 may create the pool of virtual machines to include the predicted pre-provisioned virtual machines, which are indicated by the VM indicator 524. For instance, the pool of virtual machines may include virtual machine 504. The first provisioning mechanism 510 may provide the machine-based provisioning agent 520 to the virtual machine 504 (e.g., by storing the machine-based provisioning agent 520 on the virtual hard disk 516 of the virtual machine 504). The machine-based provisioning agent 520 may initiate deployment of the virtual machine 504.

At step 206, the pre-provisioned virtual machines are assigned to user(s) without a reboot. For instance, requests for virtual machines may be received from the user(s). The requests may specify requested attributes for the various virtual machines. The pre-provisioned virtual machines having the requested attributes are identified. For example, a first request may specify first attributes, including a first OS, a first storage type, a first size, and a first network; a second request may specify second attributes, including a second OS, a second storage type, a second size, and a second network, and so on. In accordance with this example, a first pre-provisioned virtual machine having the first attributes may be assigned to a user from whom the first request is received; a second pre-provisioned virtual machine having the second attributes may be assigned to a user from whom the second request is received, and so on. Accordingly, the networking artifacts associated with the pre-provisioned virtual machines may be updated (e.g., replaced) with user-specific networking artifacts. The operating system disk for each pre-provisioned virtual machine may be moved under the user subscription of the corresponding user. Each pre-provisioned virtual machine may be moved under a user tenant of the corresponding user. In an example implementation, the user-specific provisioning agent 522 assigns the pre-provisioned virtual machines to the user(s) without a reboot. For instance, the second provisioning mechanism 512 may provide the user-specific provisioning agent 522 to the virtual machine 504 (e.g., by storing the user-specific provisioning agent 522 on the virtual hard disk 516 of the virtual machine 504). The user-specific provisioning agent 522 may assign the virtual machine 504 to a user.

At step 208, user-specific settings are applied to the virtual machines without a reboot. In an example implementation, the user-specific provisioning agent 522 applies the user-specific settings to the virtual machine 504 without a reboot.

In some example embodiments, one or more steps 202, 204, 206, and/or 208 of flowchart 200 may not be performed. Moreover, steps in addition to or in lieu of steps 202, 204, 206, and/or 208 may be performed.

Two example deployment scenarios will now be discussed to demonstrate some potential advantages of the method of flowchart 200. Both scenarios relate to configuring a virtual machine to have a user-specific computer name. The scenarios are discussed in the context of Microsoft Windows® and Microsoft Azure® for non-limiting, illustrative purposes. Both scenarios use an ISO as a provisioning mechanism for non-limiting, illustrative purposes. An ISO is an image format for a digital versatile disc (DVD) drive. The ISO may contain configuration information for the virtual machine. The ISO may be attached to the virtual machine, and the virtual machine may see the ISO as an optical drive, which enables the virtual machine to read the information from the ISO. It will be recognized that the scenarios are applicable to any suitable context and may utilize any suitable provisioning mechanism.

In a first deployment scenario, a generalized image of a virtual machine is deployed for a user. The ISO is prepared on a host and attached to the virtual machine. The ISO contains user settings, unattend.xml, and Windows Provisioning Agent (PA) executables. After boot, Windows Setup runs configuration passes, including a Specialize Pass and an OobeSystem Pass.

In the Specialize Pass, Windows Setup reads the computer name and other settings from unattend.xml and applies them. Windows Setup installs the Windows PA by copying executables of the Windows PA from the ISO to a C:\Windows\OEM folder. Windows Setup also runs the Windows PA with "/ConfigurationPass:specialize," which applies some configuration that is specific to Microsoft Azure®. The virtual machine is rebooted if required.

In the OobeSystem Pass, Windows Setup applies settings from OobeSystem pass in unattend.xml. Windows Setup also runs the Windows PA with "/ConfigurationPass:oobeSystem". This applies remaining Azure-specific configuration. The Windows PA notifies "Report Ready" to Azure, meaning provisioning is completed.

If any error happens during Windows Setup, Windows Setup launches the Windows PA with "/ConfigurationPass:errorHandler," which reports "Not Ready" to Azure to indicate a provisioning failure. If any errors happen during execution of Windows PA, the errors are logged in PA logs, but this does not result in a provisioning failure.

In a second deployment scenario, a pre-provisioning service deploys and provisions the pre-provisioned virtual machines with default configurations. During this deployment, the Windows PA configures Session Manager to run a native application on next boot. The Windows PA also creates a scheduled task. The task is configured to run at system startup under a SYSTEM account. Running the task launches the Windows PA with a new parameter value for the ConfigurationPass parameter: "/ConfigurationPass:reprovision". The Windows PA reboots the virtual machine. After the reboot, the Session Manager launches the native executable, which waits for an ISO that contains the computer name. A host agent injects an ISO during the assignment of the pre-provisioned virtual machine to the user. The native executable reads the user-specific configurations and applies the computer name. The system continues to initialize, and the scheduled task runs. When launched with /ConfigurationPass:reprovision, the Windows PA applies the remaining user-specific configurations. The Windows PA reports "Ready" to Azure at the end of the deployment, which indicates completion of provisioning.

Many of the operations that the Windows PA performs may be built into an offline image to support pre-provisioning. It may be desirable for Azure to deploy and pre-configure the virtual machines with default configurations by going through Windows Setup and Windows PA.

As shown in FIG. 3, the method of flowchart 300 begins at step 302. In step 302, a machine-based provisioning agent is executed on a virtual machine that is hosted on a computing system. In an example implementation, the virtual processor(s) 518 execute the machine-based provisioning agent 520 on the virtual machine 504, which is hosted on the computing system 500. For instance, the first provisioning mechanism 510 may store the machine-based provisioning agent 520 on the virtual hard disk 516 of the virtual machine 504, and the virtual processor(s) 518 may retrieve the machine-based provisioning agent 520 from the virtual hard disk 516 to execute the machine-based provisioning agent 520.

At step 304, deployment of the virtual machine is initiated by the machine-based provisioning agent. In an example implementation, the machine-based provisioning agent 520 initiates deployment of the virtual machine 504.

At step 306, a user-specific provisioning agent is installed on the virtual machine by the machine-based provisioning agent. In an example implementation, the machine-based provisioning agent 520 installs the user-specific provisioning agent 522 on the virtual machine 504.

At step 308, a restart of the virtual machine is initiated by the machine-based provisioning agent. In an example implementation, the machine-based provisioning agent 520 initiates a restart of the virtual machine 504.

At step 310, the user-specific provisioning agent is executed on the virtual machine. For instance, the user-specific provisioning agent may be executed on the virtual machine in response to the virtual machine being restarted. In an example implementation, the virtual processor(s) 518 execute the user-specific provisioning agent 522 on the virtual machine 504. For instance, the second provisioning mechanism 512 may store the user-specific provisioning agent 522 on the virtual hard disk 516 of the virtual machine 504, and the virtual processor(s) 518 may retrieve the user-specific provisioning agent 522 from the virtual hard disk 516 to execute the user-specific provisioning agent 522.

At step 312, the deployment of the virtual machine is paused, prior to execution of code that depends on a name of the virtual machine, to wait for receipt of user-specific setting(s) of the virtual machine by the user-specific provisioning agent. For example, the user-specific provisioning agent may prevent the operating system (OS) that is handling the deployment from continuing with booting the virtual machine. In accordance with this example, the user-specific provisioning agent may cause the OS to enter a program loop until the user-specific setting(s) are received. A program loop is execution of a sub-routine that is configured to repeat until a triggering event stops the execution of the sub-routine. For instance, the user-specific provisioning agent may be configured to stop the execution of the sub-routine based at least in part on receipt of the user-specific setting(s). In an example implementation, the user-specific provisioning agent 522 pauses the deployment of the virtual machine 504, prior to execution of code that depends on a name of the virtual machine 504, to wait for receipt of user-specific setting(s) of the virtual machine 504.

At step 314, the deployment of the virtual machine is continued (e.g., resumed) by the user-specific provisioning agent. For instance, the deployment of the virtual machine may be continued based at least in part on receipt of the user-specific setting(s). Continuing the deployment of the virtual machine includes configuring the virtual machine to have at least one of the user-specific setting(s). For instance, continuing the deployment may include configuring the virtual machine to have a user-specific name that is included among the user-specific setting(s). In an example implementation, the user-specific provisioning agent 522 continues the deployment of the virtual machine 504, which includes configuring the virtual machine 504 to have at least one of the user-specific setting(s).

In an example embodiment, continuing the deployment of the virtual machine at step 314 is performed based at least in part on receipt of a request to deploy a virtual machine from a user and further based at least in part on a determination that configuration parameter(s) of the virtual machine on which the user-specific provisioning agent is installed and configuration parameter(s) that are specified by the request are same.

In another example embodiment, continuing the deployment of the virtual machine at step 314 is performed without rebooting the virtual machine.

In yet another example embodiment, the user-specific setting(s) of the virtual machine include a machine name, a user name, and/or a password. In accordance with this embodiment, continuing the deployment of the virtual machine at step 314 includes assigning the machine name, the user name, and/or the password to the virtual machine by the user-specific provisioning agent. For instance, continuing the deployment of the virtual machine at step 314 may include assigning the machine name, the user name, and/or the password to the virtual machine by the user-specific provisioning agent prior to execution of code that depends on the machine name.

At step 316, the machine-based provisioning agent is called by the user-specific provisioning agent. In an example implementation, the user-specific provisioning agent 522 calls the machine-based provisioning agent 520.

At step 318, the deployment of the virtual machine is finished by the machine-based provisioning agent. For instance, the machine-based provisioning agent may configure the virtual machine to have a user-specific username and/or a user-specific password. In accordance with this example, the user-specific username and the user-specific password may be included among the user-specific setting(s). In an example implementation, the machine-based provisioning agent 520 finishes the deployment of the virtual machine.

In an example embodiment, a plurality of operations are configured to deploy the virtual machine. In accordance with this embodiment, the machine-based provisioning agent performs a first portion of the plurality of operations, and the user-specific provisioning agent performs a second portion of the plurality of operations. In accordance with this embodiment, the first portion of the plurality of operations includes initiating the deployment of the virtual machine at step 304, installing the user-specific provisioning agent at step 306, and initiating the restart of the virtual machine at step 308. In further accordance with this embodiment, the second portion of the plurality of operations includes pausing the deployment of the virtual machine at step 312 and continuing the deployment of the virtual machine at step 314. In an example implementation, the machine-based provisioning agent 520 performs the first portion of the plurality of operations, and the user-specific provisioning agent 522 performs the second portion of the plurality of operations.

In another example embodiment, finishing the deployment of the virtual machine at step 318 includes performing user-specific operations that configure the virtual machine by the machine-based provisioning agent. For instance, finishing the deployment may include configuring the virtual machine to have a user-specific username and/or a user-specific password that is included among the user-specific setting(s). The username may be an administrator username. The password may be an administrator password.

In some example embodiments, one or more steps 302, 304, 306, 308, 310, 312, 314, 316, and/or 318 of flowchart 300 may not be performed. Moreover, steps in addition to or in lieu of steps 302, 304, 306, 308, 310, 312, 314, 316, and/or 318 may be performed. For instance, in an example embodiment, the method of flowchart 300 further includes receiving a status request by the user-specific provisioning agent from the computing system while the deployment of the virtual machine is paused. The status request is configured to provoke a status response from the virtual machine. For example, the user-specific provisioning agent 522 may receive a status request 526 from the computing system 500 while the deployment of the virtual machine 504 is paused. In accordance with this example, the status request 526 is configured to provoke a status response 528 from the virtual machine 504. In accordance with this embodiment, the method of flowchart 300 further includes providing the status response by the user-specific provisioning agent to the computing system while the deployment of the virtual machine is paused. The status response indicates that the virtual machine is available to be assigned to a user. For example, the user-specific provisioning agent 522 may provide the status response 528 to the computing system 500 while the deployment of the virtual machine 504 is paused. In accordance with this example, the status response 528 indicates that the virtual machine 504 is available to be assigned to a user (e.g., to be used by the user).

In another example embodiment, the method of flowchart 300 further includes providing a notification, which indicates that deployment of the virtual machine is complete, by the machine-based provisioning agent to a user from whom a request for the virtual machine is received in response to the machine-based provisioning agent finishing the deployment of the virtual machine. For example, the machine-based provisioning agent 520 may provide a notification 534, which indicates that deployment of the virtual machine 504 is complete, to a user from whom the deployment request 530 is received in response to the machine-based provisioning agent 520 finishing the deployment of the virtual machine 504.

As shown in FIG. 4, the method of flowchart 400 begins at step 402. In step 402, deployment of a virtual machine on a computing system is initiated. In an example implementation, the machine-based provisioning agent 520 initiates deployment of the virtual machine 504 on the computing system 500.

At step 404, a restart of the virtual machine is initiated. In an example implementation, the machine-based provisioning agent 520 restarts the virtual machine 504.

At step 406, the deployment of the virtual machine is paused, prior to execution of code that depends on a name of the virtual machine, to wait for receipt of user-specific setting(s) of the virtual machine. In an example implementation, the user-specific provisioning agent 522 pauses the deployment of the virtual machine 504 prior to execution of code that depends on a name of the virtual machine 504 to wait for receipt of user-specific setting(s) of the virtual machine 504.

At step 408, a status request is received from the computing system while the deployment of the virtual machine is paused. In an example implementation, the user-specific provisioning agent 522 receives a status request 526 from the status logic 514. The status logic 514 is shown in FIG. 5 to be incorporated in the hypervisor 502 for non-limiting, illustrative purposes. It will be recognized that the status logic 514 need not necessarily be included in the hypervisor 502.

At step 410, a status response is provided to the computing system while the deployment of the virtual machine is paused. The status response indicates that the virtual machine is available to be assigned to a user. In an example implementation, the user-specific provisioning agent 522 provides a status response 528 to the status logic 514 while the deployment of the virtual machine 504 is paused. The status response 528 indicates that the virtual machine 504 is available to be assigned to a user.

At step 412, the deployment of the virtual machine is continued. For instance, the deployment of the virtual machine may be continued based at least in part on receipt of the user-specific setting(s). Continuation of the deployment includes configuring the virtual machine to have at least one of the user-specific setting(s). For instance, continuing the deployment of the virtual machine may be performed without rebooting the virtual machine. In an example implementation, the user-specific provisioning agent 522 continues the deployment of the virtual machine 504, including configuring the virtual machine 504 to have at least one of the user-specific setting(s) 532.

In an example embodiment, the user-specific setting(s) of the virtual machine include a machine name, a user name, and/or a password. In accordance with this embodiment, continuing the deployment of the virtual machine at step 412 includes assigning the machine name, the user name, and/or the password to the virtual machine. In further accordance with this embodiment, the machine name, the user name, and/or the password may be assigned to the virtual machine prior to execution of code that depends on the machine name.

At step 414, a notification, which indicates that deployment of the virtual machine is complete, is provided to the user. In an example implementation, the machine-based provisioning agent 520 or the user-specific provisioning agent 522 provides a notification 534 to the user. In accordance with this implementation, the notification 534 indicates that deployment of the virtual machine 516 is complete.

In some example embodiments, one or more steps 402, 404, 406, 408, 410, 412, and/or 414 of flowchart 400 may not be performed. Moreover, steps in addition to or in lieu of steps 402, 404, 406, 408, 410, 412, and/or 414 may be performed. For instance, in an example embodiment, the method of flowchart 400 further includes receiving a request to deploy a virtual machine having specified configuration parameter(s) from a user. For example, the request may be received in response to providing the status response at step 410. In an example implementation, the hypervisor 502 receives a deployment request 530, which requests deployment of a virtual machine having the specified configuration parameter(s), from the user. The deployment request 530 includes the user-specific setting(s) 532 of the virtual machine 504, which may include one or more of the configuration parameter(s). In accordance with this embodiment, the method of flowchart 400 further includes determining that configuration parameter(s) of the virtual machine and the specified configuration parameter(s) are same. In an example implementation, the hypervisor 502 determines that the configuration parameter(s) of the virtual machine 504 and the specified configuration parameter(s) are the same. In further accordance with this implementation, the deployment of the virtual machine may be continued at step 412 in response to determining that the configuration parameter(s) of the virtual machine and the specified configuration parameter(s) are the same.

It will be recognized that the computing system 500 may not include one or more of the hypervisor 502, the virtual machine 504, the prediction logic 506, the pre-dependency pausing logic 508, the first provisioning mechanism 510, the second provisioning mechanism 512, the status logic 514, the virtual hard disk 516, the virtual processor(s) 518, the machine-based provisioning agent 520, and/or the user-specific provisioning agent 522. Furthermore, the computing system 500 may include components in addition to or in lieu of the hypervisor 502, the virtual machine 504, the prediction logic 506, the pre-dependency pausing logic 508, the first provisioning mechanism 510, the second provisioning mechanism 512, the status logic 514, the virtual hard disk 516, the virtual processor(s) 518, the machine-based provisioning agent 520, and/or the user-specific provisioning agent 522.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

The pre-dependency pausing logic 108, the pre-dependency pausing logic 508, flowchart 200, flowchart 300, and/or flowchart 400 may be implemented in hardware, software, firmware, or any combination thereof.

For example, the pre-dependency pausing logic 108, the pre-dependency pausing logic 508, flowchart 200, flowchart 300, and/or flowchart 400 may be implemented, at least in part, as computer program code configured to be executed in one or more processors.

In another example, the pre-dependency pausing logic 108, the pre-dependency pausing logic 508, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to pause deployment of a pre-provisioned virtual machine comprises memory and one or more processors coupled to the memory. The one or more processors are configured to execute a machine-based provisioning agent and a user-specific provisioning agent, which are configured to perform respective portions of a plurality of operations that deploy a virtual machine that is hosted on the system, on the virtual machine. The machine-based provisioning agent is configured to perform the following operations: initiate deployment of the virtual machine; install the user-specific provisioning agent on the virtual machine; and initiate a restart of the virtual machine. The user-specific provisioning agent is configured to perform the following operations in response to the restart of the virtual machine: pause the deployment of the virtual machine, prior to execution of code that depends on a name of the virtual machine, to wait for receipt of one or more user-specific settings of the virtual machine; and continue the deployment of the virtual machine, which includes configuring the virtual machine to have at least one of the one or more user-specific settings, based at least in part on receipt of the one or more user-specific settings.

In a first aspect of the example system, the user-specific provisioning agent is further configured to call the machine-based provisioning agent in response to configuring the virtual machine to have the at least one of the one or more user-specific settings, which causes the machine-based provisioning agent to finish the deployment of the virtual machine.

In an implementation of the first aspect of the example system, the machine-based provisioning agent is configured to finish the deployment of the virtual machine by performing user-specific operations that configure the virtual machine.

In a second aspect of the example system, the one or more user-specific settings of the virtual machine include a machine name. In accordance with the second aspect, the user-specific provisioning agent is configured to continue the deployment of the virtual machine by assigning the machine name to the virtual machine. The second aspect of the example system may be implemented in combination with the first aspect of the example system, though the example embodiments are not limited in this respect.

In an implementation of the second aspect of the example system, the user-specific provisioning agent is configured to continue the deployment of the virtual machine by assigning the machine name to the virtual machine prior to execution of code that depends on the machine name.

In a third aspect of the example system, the machine-based provisioning agent is configured to provide a notification, which indicates that deployment of the virtual machine is complete, to a user from whom a request for the virtual machine is received in response to the machine-based provisioning agent finishing the deployment of the virtual machine. The third aspect of the example system may be implemented in combination with the first and/or second aspect of the example system, though the example embodiments are not limited in this respect.

In a fourth aspect of the example system, the user-specific provisioning agent is configured to continue the deployment of the virtual machine without rebooting the virtual machine. The fourth aspect of the example system may be implemented in combination with the first, second, and/or third aspect of the example system, though the example embodiments are not limited in this respect.

In a fifth aspect of the example system, the user-specific provisioning agent is further configured to receive a status request from the system while the deployment of the virtual machine is paused. The status request is configured to provoke a status response from the virtual machine. In accordance with the fifth aspect, the user-specific provisioning agent is further configured to provide the status response to the system while the deployment of the virtual machine is paused. The status response indicates that the virtual machine is available to be assigned to a user. The fifth aspect of the example system may be implemented in combination with the first, second, third, and/or fourth aspect of the example system, though the example embodiments are not limited in this respect.

In an example method of pausing deployment of a pre-provisioned virtual machine, a machine-based provisioning agent, which performs a first portion of a plurality of operations that deploy a virtual machine that is hosted on a computing system, is executed on the virtual machine. The first portion of the plurality of operations comprises initiating deployment of the virtual machine. The first portion of the plurality of operations further comprises installing a user-specific provisioning agent on the virtual machine. The first portion of the plurality of operations further comprises initiating a restart of the virtual machine. The user-specific provisioning agent, which performs a second portion of the plurality of operations that deploy the virtual machine in response to the restart of the virtual machine, is executed on the virtual machine. The second portion of the plurality of operations comprises pausing the deployment of the virtual machine, prior to execution of code that depends on a name of the virtual machine, to wait for receipt of one or more user-specific settings of the virtual machine. The second portion of the plurality of operations further comprises continuing the deployment of the virtual machine, which includes configuring the virtual machine to have at least one of the one or more user-specific settings, based at least in part on receipt of the one or more user-specific settings.

In a first aspect of the example method, the example method further comprises calling the machine-based provisioning agent by the user-specific provisioning agent in response to configuring the virtual machine to have the at least one of the one or more user-specific settings. In accordance with the first aspect, the example method further comprises finishing the deployment of the virtual machine by the machine-based provisioning agent based at least in part on the user-specific provisioning agent calling the machine-based provisioning agent.

In an implementation of the first aspect of the example method, finishing the deployment of the virtual machine comprises performing user-specific operations that configure the virtual machine by the machine-based provisioning agent.

In a second aspect of the example method, the one or more user-specific settings of the virtual machine include a machine name. In accordance with the second aspect, continuing the deployment of the virtual machine comprises assigning the machine name to the virtual machine by the user-specific provisioning agent. The second aspect of the example method may be implemented in combination with the first aspect of the example method, though the example embodiments are not limited in this respect.

In an implementation of the second aspect of the example method, continuing the deployment of the virtual machine comprises assigning the machine name to the virtual machine by the user-specific provisioning agent prior to execution of code that depends on the machine name.

In a third aspect of the example method, the example method further comprises providing a notification, which indicates that deployment of the virtual machine is complete, by the machine-based provisioning agent to a user from whom a request for the virtual machine is received in response to the machine-based provisioning agent finishing the deployment of the virtual machine. The third aspect of the example method may be implemented in combination with the first and/or second aspect of the example method, though the example embodiments are not limited in this respect.

In a fourth aspect of the example method, continuing the deployment of the virtual machine comprises continuing the deployment of the virtual machine by the user-specific provisioning agent without rebooting the virtual machine. The fourth aspect of the example method may be implemented in combination with the first, second, and/or third aspect of the example method, though the example embodiments are not limited in this respect.

In a fifth aspect of the example method, the example method further comprises receiving a status request by the user-specific provisioning agent from the computing system while the deployment of the virtual machine is paused. The status request is configured to provoke a status response from the virtual machine. In accordance with the fifth aspect, the example method further comprises providing the status response by the user-specific provisioning agent to the computing system while the deployment of the virtual machine is paused. The status response indicates that the virtual machine is available to be assigned to a user. The fifth aspect of the example method may be implemented in combination with the first, second, third, and/or fourth aspect of the example method, though the example embodiments are not limited in this respect.

An example computer program product comprises a computer-readable storage medium having instructions recorded thereon for enabling a processor-based system to perform operations to pause deployment of a pre-provisioned virtual machine. The operations that the processor-based system is enabled to perform comprise execute a machine-based provisioning agent on a virtual machine that is hosted on the processor-based system. The operations further comprise cause the machine-based provisioning agent to perform a first portion of a plurality of operations that deploy the virtual machine. The first portion of the plurality of operations comprises initiate deployment of the virtual machine. The first portion of the plurality of operations further comprises install the user-specific provisioning agent on the virtual machine. The first portion of the plurality of operations further comprises initiate a restart of the virtual machine. The operations that the processor-based system is enabled to perform further comprise execute a user-specific provisioning agent on the virtual machine. The operations that the processor-based system is enabled to perform further comprise, in response to the restart of the virtual machine, cause the user-specific provisioning agent to perform a second portion of the plurality of operations that deploy the virtual machine. The second portion of the plurality of operations comprises pause the deployment of the virtual machine, prior to execution of code that depends on a name of the virtual machine, to wait for receipt of one or more user-specific settings of the virtual machine. The second portion of the plurality of operations further comprises continue the deployment of the virtual machine, which includes configuring the virtual machine to have at least one of the one or more user-specific settings, based at least in part on receipt of the one or more user-specific settings.

In a first aspect of the example computer program product, the second portion of the plurality of operations, which is performed by the user-specific provisioning agent, comprises call the machine-based provisioning agent in response to the virtual machine being configured to have the at least one of the one or more user-specific settings. In accordance with the first aspect, the first portion of the plurality of operations, which is performed by the machine-based provisioning agent, comprises finish the deployment of the virtual machine based at least in part on the user-specific provisioning agent calling the machine-based provisioning agent.

In an implementation of the first aspect of the example computer program product, the first portion of the plurality of operations, which is performed by the machine-based provisioning agent, comprises finish the deployment of the virtual machine by performing user-specific operations that configure the virtual machine.

In a second aspect of the example computer program product, the first portion of the plurality of operations, which is performed by the machine-based provisioning agent, comprises provide a notification, which indicates that deployment of the virtual machine is complete, to a user from whom a request for the virtual machine is received in response to the machine-based provisioning agent finishing the deployment of the virtual machine.

IV. Example Computer System

Figure 6:
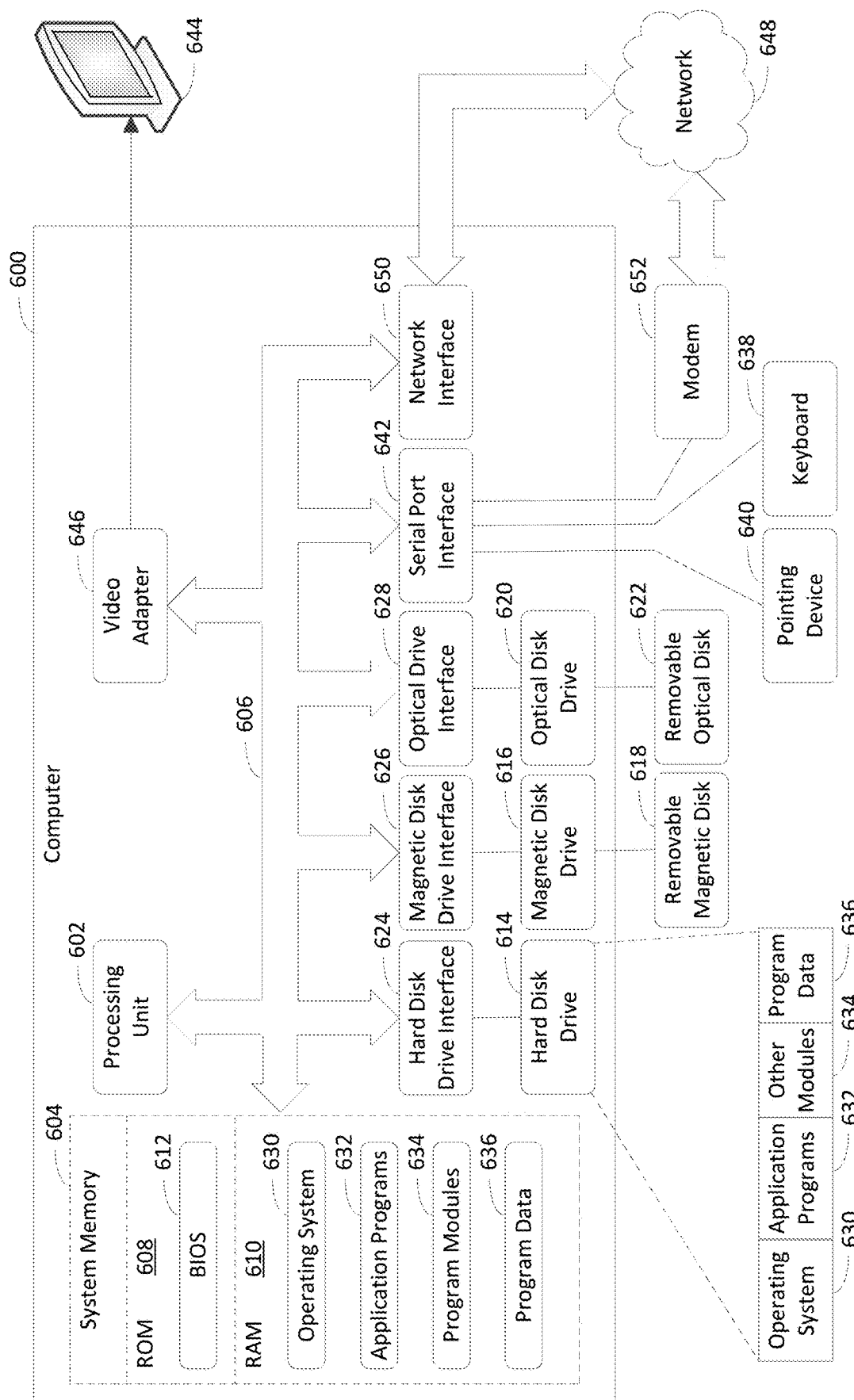
FIG. 6 depicts an example computer in which embodiments may be implemented.

FIG. 6 depicts an example computer 600 in which embodiments may be implemented. Any one or more of the user devices 102A-102M and/or any one or more of the servers 106A-106N shown in FIG. 1 and/or computing system 500 shown in FIG. 5 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) pre-dependency pausing logic 108, pre-dependency pausing logic 508, flowchart 200 (including any step of flowchart 200), flowchart 300 (including any step of flowchart 300), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to pause deployment of a pre-provisioned virtual machine, the system comprising:
   memory; and
   one or more processors coupled to the memory, the one or more processors configured to execute a machine-based provisioning agent and a user-specific provisioning agent, which are configured to perform respective portions of a plurality of operations that deploy a virtual machine that is hosted on the system, on the virtual machine, wherein the one or more processors are configured to:
   provision the virtual machine by creating the virtual machine and installing the machine-based provisioning agent on the virtual machine; and
   in response to the machine-based provisioning agent being installed, execute the machine-based provisioning agent, which performs the following operations while executing on the virtual machine:
   initiate deployment of the virtual machine by applying a default configuration to the virtual machine;
   install the user-specific provisioning agent on the virtual machine;
   modify a registry entry on the virtual machine to enable starting of the user-specific provisioning agent upon restart of the virtual machine; and
   initiate a restart of the virtual machine such that the user-specific provisioning agent is started in response to the restart of the virtual machine to perform the following operations:
   wait for receipt of a user-specific setting of the virtual machine by pausing the deployment of the virtual machine prior to execution of code that depends on a name of the virtual machine;
   initiate a program loop in an operating system of the virtual machine, the program loop including execution of a sub-routine that is configured to repeat until the user-specific setting of the virtual machine is received, wherein the user-specific setting indicates a name of the virtual machine;
stop the execution of the sub-routine based at least in part on receipt of the user-specific setting;
continue the deployment of the virtual machine, which includes configuring the virtual machine to have the user-specific setting, which indicates the name of the virtual machine, based at least in part on receipt of the user-specific setting; and
call the machine-based provisioning agent to complete the deployment of the virtual machine; and
wherein the machine-based provisioning agent is configured to perform the following operation while executing on the virtual machine:
complete the deployment of the virtual machine in response to the virtual machine being configured to have the user-specific setting.

2. The system of claim 1, wherein the machine-based provisioning agent is configured to finish the deployment of the virtual machine by performing user-specific operations that configure the virtual machine.

3. The system of claim 1,
wherein the user-specific provisioning agent is configured to continue the deployment of the virtual machine by assigning the name of the virtual machine to the virtual machine.

4. The system of claim 3, wherein the user-specific provisioning agent is configured to continue the deployment of the virtual machine by assigning the name of the virtual machine to the virtual machine prior to execution of code that depends on the name of the virtual machine.

5. The system of claim 1, wherein the machine-based provisioning agent is configured to provide a notification, which indicates that deployment of the virtual machine is complete, to a user from whom a request for the virtual machine is received in response to the machine-based provisioning agent finishing the deployment of the virtual machine.

6. The system of claim 1, wherein the user-specific provisioning agent is configured to continue the deployment of the virtual machine without initiating another restart of the virtual machine.

7. The system of claim 1, wherein the user-specific provisioning agent is further configured to:
receive a status request from the system while the deployment of the virtual machine is paused, the status request configured to provoke a status response from the virtual machine; and
provide the status response to the system while the deployment of the virtual machine is paused, the status response indicating that the virtual machine is available to be assigned to a user.

8. A method of pausing deployment of a pre-provisioned virtual machine, the method comprising:
provisioning a virtual machine by creating the virtual machine and installing a machine-based provisioning agent on the virtual machine; and
in response to the machine-based provisioning agent being installed, executing the machine-based provisioning agent, which performs a first portion of a plurality of operations that deploy the virtual machine, on the virtual machine, the first portion of the plurality of operations comprising:
initiating, by the machine-based provisioning agent, deployment of the virtual machine by applying a default configuration to the virtual machine;
installing, by the machine-based provisioning agent, a user-specific provisioning agent on the virtual machine;
modifying, by the machine-based provisioning agent, a registry entry on the virtual machine to enable starting of the user-specific provisioning agent upon restart of the virtual machine; and
initiating, by the machine-based provisioning agent, a restart of the virtual machine such that the user-specific provisioning agent is started in response to the restart of the virtual machine; and
executing the user-specific provisioning agent, which performs a second portion of the plurality of operations that deploy the virtual machine, on the virtual machine, the second portion of the plurality of operations comprising:
waiting, by the user-specific provisioning agent, for receipt of a user-specific setting of the virtual machine by pausing the deployment of the virtual machine prior to execution of code that depends on a name of the virtual machine;
initiating, by the user-specific provisioning agent, a program loop in an operating system of the virtual machine, the program loop including execution of a sub-routine that is configured to repeat until the user-specific setting of the virtual machine is received, wherein the user-specific setting indicates a name of the virtual machine;
stopping, by the user-specific provisioning agent, the execution of the sub-routine based at least in part on receipt of the user-specific setting;
continuing, by the user-specific provisioning agent, the deployment of the virtual machine, which includes configuring the virtual machine to have the user-specific setting, which indicates the name of the virtual machine, based at least in part on receipt of the user-specific setting; and
calling, by the user-specific provisioning agent, the machine-based provisioning agent to complete the deployment of the virtual machine; and
in response to the virtual machine being configured to have the user-specific setting, completing the deployment of the virtual machine by the machine-based provisioning agent while the machine-based provisioning agent executes on the virtual machine.

9. The method of claim 8, wherein completing the deployment of the virtual machine comprises:
performing user-specific operations that configure the virtual machine by the machine-based provisioning agent.

10. The method of claim 8,
wherein continuing the deployment of the virtual machine comprises:
assigning the name of the virtual machine to the virtual machine by the user-specific provisioning agent.

11. The method of claim 10, wherein continuing the deployment of the virtual machine comprises:
assigning the name of the virtual machine to the virtual machine by the user-specific provisioning agent prior to execution of code that depends on the name of the virtual machine.

12. The method of claim 8, further comprising:
providing a notification, which indicates that deployment of the virtual machine is complete, by the machine-based provisioning agent to a user from whom a request for the virtual machine is received in response to the machine-based provisioning agent finishing the deployment of the virtual machine.

13. The method of claim 8, wherein continuing the deployment of the virtual machine comprises:
continuing the deployment of the virtual machine by the user-specific provisioning agent without initiating another restart of the virtual machine.

14. The method of claim 8, further comprising:
receiving a status request by the user-specific provisioning agent from a computing system, which hosts the virtual machine, while the deployment of the virtual machine is paused, the status request configured to provoke a status response from the virtual machine; and
providing the status response by the user-specific provisioning agent to the computing system while the deployment of the virtual machine is paused, the status response indicating that the virtual machine is available to be assigned to a user.

15. A computer program product comprising a computer-readable storage medium having instructions recorded thereon for enabling a processor-based system to perform operations to pause deployment of a pre-provisioned virtual machine, the operations comprising:
provision a virtual machine by creating the virtual machine and installing a machine-based provisioning agent on the virtual machine;
in response to the machine-based provisioning agent being installed, execute the machine-based provisioning agent on the virtual machine which is hosted on the processor-based system;
cause the machine-based provisioning agent to perform a first portion of a plurality of operations that deploy the virtual machine, the first portion of the plurality of operations comprising:
 initiate, by the machine-based provisioning agent, deployment of the virtual machine by applying a default configuration to the virtual machine;
 install, by the machine-based provisioning agent, a user-specific provisioning agent on the virtual machine;
 modify, by the machine-based provisioning agent, a registry entry on the virtual machine to enable starting of the user-specific provisioning agent upon restart of the virtual machine; and
 initiate, by the machine-based provisioning agent, a restart of the virtual machine such that the user-specific provisioning agent is started in response to the restart of the virtual machine;
execute the user-specific provisioning agent on the virtual machine; and
in response to the restart of the virtual machine, cause the user-specific provisioning agent to perform a second portion of the plurality of operations that deploy the virtual machine, the second portion of the plurality of operations comprising:
 wait, by the user-specific provisioning agent, for receipt of a user-specific setting of the virtual machine by pausing the deployment of the virtual machine prior to execution of code that depends on a name of the virtual machine;
 initiate, by the user-specific provisioning agent, a program loop in an operating system of the virtual machine, the program loop including execution of a sub-routine that is configured to repeat until the user-specific setting of the virtual machine is received, wherein the user-specific setting indicates a name of the virtual machine;
 stop, by the user-specific provisioning agent, the execution of the sub-routine based at least in part on receipt of the user-specific setting;
 continue, by the user-specific provisioning agent, the deployment of the virtual machine, which includes configuring the virtual machine to have the user-specific setting, which indicates the name of the virtual machine, based at least in part on receipt of the user-specific setting; and
 call, by the user-specific provisioning agent, the machine-based provisioning agent to complete the deployment of the virtual machine;
wherein the first portion of the plurality of operations, which is performed by the machine-based provisioning agent, comprises:
 finish the deployment of the virtual machine based at least in part on the machine-based provisioning agent being called by the user-specific provisioning agent.

16. The computer program product of claim 15, wherein the first portion of the plurality of operations, which is performed by the machine-based provisioning agent, comprises:
finish the deployment of the virtual machine by performing user-specific operations that configure the virtual machine.

17. The computer program product of claim 15, wherein the second portion of the plurality of operations comprises:
continue, by the user-specific provisioning agent, the deployment of the virtual machine by assigning the name of the virtual machine to the virtual machine.

18. The computer program product of claim 17, wherein the second portion of the plurality of operations comprises:
continue, by the user-specific provisioning agent, the deployment of the virtual machine by assigning the name of the virtual machine to the virtual machine prior to execution of code that depends on the name of the virtual machine.

19. The computer program product of claim 15, wherein the first portion of the plurality of operations further comprises:
provide a notification, which indicates that deployment of the virtual machine is complete, by the machine-based provisioning agent to a user from whom a request for the virtual machine is received in response to the machine-based provisioning agent finishing the deployment of the virtual machine.

20. The computer program product of claim 15, wherein the second portion of the plurality of operations comprises:
continue, by the user-specific provisioning agent, the deployment of the virtual machine without initiating another restart of the virtual machine.

* * * * *